US007724742B2

(12) United States Patent
Huotari et al.

(10) Patent No.: US 7,724,742 B2
(45) Date of Patent: May 25, 2010

(54) COMMUNICATION BONDING SYSTEMS AND METHODS

(75) Inventors: Allen J. Huotari, Garden Grove, CA (US); Matthew McRae, Laguna Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 1514 days.

(21) Appl. No.: 11/041,320

(22) Filed: Jan. 24, 2005

(65) Prior Publication Data

US 2006/0187911 A1 Aug. 24, 2006

(51) Int. Cl.
*H04L 12/28* (2006.01)
*H04J 3/00* (2006.01)

(52) U.S. Cl. .................................. 370/392; 370/464

(58) Field of Classification Search .................... None
See application file for complete search history.

(56) References Cited

U.S. PATENT DOCUMENTS 6,563,821 B1 * 5/2003 Hong et al. ................ 370/389
6,842,446 B2 1/2005 Everson et al.
6,963,582 B1 * 11/2005 Xu ........................... 370/466
2002/0068588 A1 * 6/2002 Yoshida et al. ............. 455/461
2003/0039250 A1 * 2/2003 Nichols et al. ............. 370/394
2003/0210663 A1 * 11/2003 Everson et al. ............. 370/329
2004/0022276 A1 * 2/2004 Gazier et al. ............... 370/535
2004/0085951 A1 * 5/2004 Rezaiifar et al. ........... 370/352
2005/0201343 A1 * 9/2005 Sivalingham et al. ....... 370/338
2006/0126660 A1 * 6/2006 Denney et al. ............. 370/468

* cited by examiner

*Primary Examiner*—Gregory B Sefcheck
*Assistant Examiner*—Suk Jin Kang
(74) *Attorney, Agent, or Firm*—Haynes and Boone, LLP

(57) ABSTRACT

Systems and methods are disclosed herein to provide IP bonding. For example, in accordance with an embodiment of the present invention, an IP bonding scheme is disclosed that modifies Generic Routing Encapsulation techniques such that information may be divided and carried through multiple paths (e.g., to improve capacity).

13 Claims, 2 Drawing Sheets

COMMUNICATION BONDING SYSTEMS AND METHODS

TECHNICAL FIELD

The present invention relates generally to communication systems and networks and, more particularly, to bonding techniques.

BACKGROUND

The increased utilization of the Internet, such as for multimedia applications, has created a growing demand for higher data rates. Consequently, Internet service providers have attempted to meet the demand by increasing the data rate available to their customers. Although new technologies are continually being developed to increase the data rate, it is generally cost prohibitive for an Internet service provider to deploy a new technology in their network or system architecture (e.g., between a customer and a central office of the Internet service provider). Thus, Internet service providers often prefer to leverage their current connection technologies to increase the available data rate to their customers.

Specifically, the demand for higher data rates is growing due to various factors. For example, companies may require additional capacity from their digital subscriber line for multimedia (e.g., video) applications, cable companies may require additional capacity to compete with incumbent local exchange carrier fiber deployments, and/or the central office, remote terminals, or network segments may require additional capacity due to the increased capacity between the user and the central office.

Several initiatives have been started to bond multiple channels of asymmetric digital subscriber line, data over cable service interface specification (DOCSIS), asynchronous transfer mode, Ethernet, and other types of access technologies and techniques to increase the effective information throughput. However, these types of bonding techniques typically require new hardware on both ends of the connection and/or a complete upgrade of existing equipment in the network. For example, a common approach for increasing capacity is to move to a new technology (e.g., fiber), but this approach, as noted above, generally is very costly. As a result, there is a need for improved communication techniques for providing greater data rates (i.e., capacity).

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with one or more embodiments of the present invention, systems and methods are provided to implement an Internet Protocol (IP) bonding scheme. For example, in accordance with an embodiment of the present invention, Generic Routing Encapsulation (GRE) specification techniques are modified and employed to carry the additional information required to implement an IP bonding scheme.

An IP bonding scheme may provide certain advantages over conventional bonding schemes. For example, bonding at the IP layer allows multiple paths of access to be aggregated into one logical unit without concern for the actual access technology (e.g., physical or data layer technologies). Consequently, by implementing bonding (i.e., "channel" bonding) at a higher layer (i.e., the IP layer), the prohibitive expenses of implementing higher capacity physical layer services may be avoided. Thus, IP bonding may be more flexible for an Internet service provider implementing a bonding scheme within their current network architecture.

Various bonding schemes exist (e.g., Inverse Multiplexing over Asynchronous Transfer Mode (IMA), Multi-Link Point-to-Point Protocol (ML-PPP), Ethernet bonding, Time Division Inverse Multiplexing (TDIM) bonding, Multi-Link Frame Relay (ML-FR), Layer 2 Tunneling Protocol (L2TP)), however these schemes may have certain drawbacks relative to one or more embodiments of the present invention. For example, Asymmetric Digital Subscriber Line channel bonding at the Asynchronous Transfer Mode (ATM) or Ethernet layer may require new line cards for the Digital Subscriber Line Access Multiplexers (DSLAMs) or may require an entirely new DSLAM chassis. However, by bonding at the IP layer, in accordance with an embodiment of the present invention, new software code may be written for an existing DSLAM or two or more IP channels may be recombined in a router deeper within the network (e.g., within the core network). The software code may be stored in the memory of the device (e.g., provided via a network connection or provided via a machine-readable medium, such as a compact disk or other portable medium). Furthermore, by bonding at the IP layer, in accordance with an embodiment of the present invention, different technologies may be bonded, such as for example bonding one digital subscriber line connection with one data over cable service interface specification connection.

Figure 1:
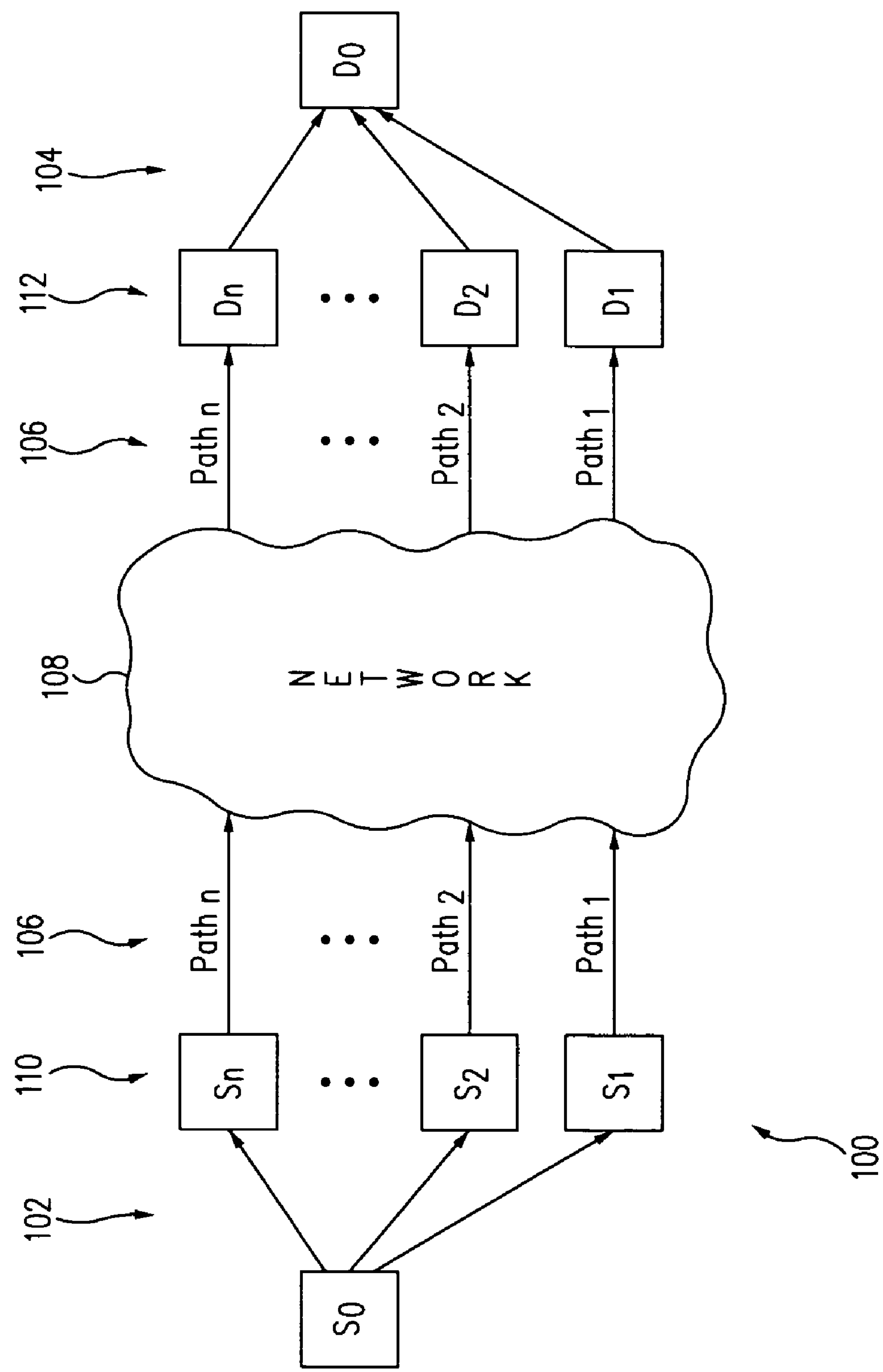
FIG. 1 shows a block diagram illustrating a bonding scheme in accordance with an embodiment of the present invention.

As an example, FIG. 1 shows a block diagram illustrating a bonding scheme 100 in accordance with an embodiment of the present invention. Bonding scheme 100 employs a modified version of Generic Routing Encapsulation (GRE) techniques to include additional information so that information may be routed over more than one path (also referred to as channel) from a device 102 (e.g., a source device or a transmitting device) to a device 104 (e.g., a sink device or a receiving device). Thus, these techniques are applicable for transferring information (e.g., through a network) between any types of devices via any number of paths.

Device 102 and/or device 104 may represent, for example, any type of device (e.g., such as a gateway, a router, a computer, a server, a switch, or a hub) for communicating information. Devices 102 and 104 may include, for example, a processor and a memory for performing the techniques discussed herein, with the processor executing instructions stored in the memory. Alternatively, devices 102 and 104 may include specialized hardware for performing the techniques discussed herein as could be implemented by one skilled in the art.

Device 102 has an IP source address So (also referred to as the "inner" source IP address), while device 104 has an IP destination address $D_0$ (also referred to as the "inner" destination IP address). As shown in FIG. 1, the information may be transferred across any number of paths 106, labeled $Path_1$ through $Path_n$ (where n represents the number of paths, with n>0) and possibly through one or more networks 108 (e.g., the Internet). Each one of paths 106 (e.g., $Path_1$) may be associated with an IP source address 110 (labeled $S_1$ through $S_n$, also referred to as an "outer" source IP address) and an IP destination address 112 (labeled $D_1$ through $D_n$, also referred to as an "outer" destination IP address).

As illustrated in FIG. 1, the information (or traffic) from device 102 (the source device) may be split or divided and provided through any number of paths to device 104 (the destination device), where the information is reassembled. This process may be viewed as an encapsulation of IP within IP followed by a decapsulation via a modification of Generic Routing Encapsulation techniques. The identification and/or negotiation (i.e., setup/teardown) of a bonded session (e.g., a tunnel technique) may be performed in a fashion as would be understood by one skilled in the art.

Figure 2:
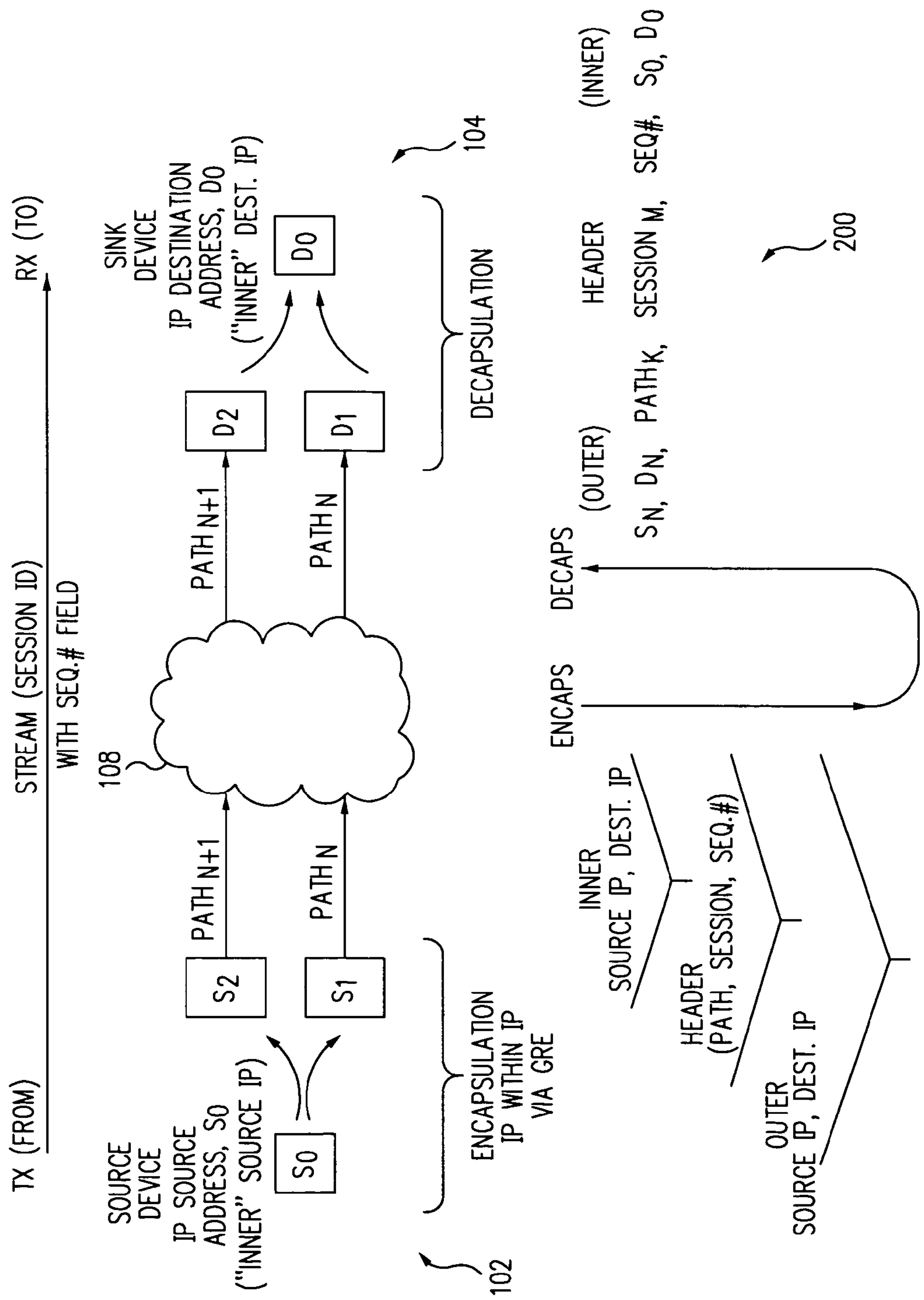
FIG. 2 shows a block diagram illustrating an exemplary implementation of the bonding scheme of FIG. 1 in accordance with an embodiment of the present invention.

As an example, FIG. 2 shows a block diagram 200 illustrating an exemplary implementation of the bonding scheme utilizing two paths (i.e., n equals two, with the paths labeled $Path_N$ and $Path_{N+}1$) in accordance with an embodiment of the present invention. As illustrated, encapsulation occurs at device 102 and decapsulation occurs at device 104, with the inner source and destination IP addresses encapsulated within the outer source and destination IP addresses. The header information, as shown, may include path, session, and sequence number information as described further herein. Thus, a protocol format may include outer and inner source and destination IP addresses along with a header (e.g., $S_n$, $D_n$, $Path_n$, $Session_M$, Sequence number, $S_0$, $D_0$).

In general, for example in reference to FIGS. 1 and 2, by assigning a path identification and a session identification inside the Generic Routing Encapsulation protocol, IP traffic can be split and reassembled across any number of physical or logical channels. At device 102 (i.e., the source or transmitter), the path identification specifies which channel the information (e.g., data) is assigned to or traveling through. At device 104 (i.e., the sink or receiver), the path identification specifies which channel the data arrived on or traveled through, which may be useful so that acknowledgements or requests for retransmission could, if desired, be sent back on the same path.

The session identification provides information to the device (e.g., device 104) that reassembles (or decapsulates) the information stream as to which traffic is bound together and must be kept grouped together. The sequence number (e.g., as specified in Generic Routing Encapsulation specification version 1) may be used to determine the order in which to reassemble the data in a given session identification.

An exemplary Generic Routing Encapsulation header, in accordance with an embodiment of the present invention, is shown in Table 1. The Generic Routing Encapsulation header (e.g., specified as version 2 or greater) may be included, for example, within a transport layer encapsulation protocol such as the following.

| MAC header | IP header | GRE header | Data ::: |
|---|---|---|---|

As shown in Table 1, the Generic Routing Encapsulation is expanded from its conventional format (e.g., version 1 which includes the sequence number and acknowledgement number fields) to include a path identification field (e.g., of four bits), a path number field (e.g., a four bit "number of paths" field), and a session identification field (e.g., of eight bits).

TABLE 1

Generic Routing Encapsulation Header

| 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| C | R | K | S | s | Recur | | | A | Flags | | | | Version | | | Protocol | | | | | | | | | | | | | | | |
| Payload Length | | | | | | | | | | | | | | | | Path ID (16-19), Path Number (20-23) Session ID (24-31) | | | | | | | | | | | | | | | |
| Sequence Number | | | | | | | | | | | | | | | | | | | | | | | | | | | | | | | |
| Acknowledgment Number | | | | | | | | | | | | | | | | | | | | | | | | | | | | | | | |

In the exemplary Generic Routing Encapsulation header of Table 1, the "C" represents a checksum present field (e.g., one bit, which generally may be set to zero). The "R" represents a routing present field (e.g., one bit, which generally may be set to zero). The "K" represents a key present field (e.g., one bit, which generally may be set to one). The "S" represents a sequence number present field (e.g., one bit, which generally may be set to one), which is set if a payload packet is present and cleared if a payload packet is not present (the Generic Routing Encapsulation packet is an acknowledgment only).

The "s" represents a strict source route field (e.g., one bit, which generally may be set to zero). The "Recur" represents a recursion control field (e.g., three bits, which is an unsigned integer that generally may be set to zero). The "A" represents an acknowledgment sequence number present field (e.g., one bit) that is set to one if the packet contains an acknowledgment number to be used for acknowledging previously transmitted data. The flags field (e.g., four bits) generally must be set to zero.

The version field (e.g., three bits) may be set to two or more, depending upon the version number to be assigned to this form of the Generic Routing Encapsulation header. The protocol field (e.g., sixteen bits) contains the protocol type of the payload packet (e.g., 0x0800, which is the Ethernet Internet Assigned Numbers Authority (IANA) number for IPv4). The payload length field (e.g., sixteen bits) indicates the size of the payload, not including the Generic Routing Encapsulation header.

The path identification (path ID) field (e.g., four bits) contains the path identification for the path (e.g., tunnel or channel) to which the packet belongs. The path number field (e.g., four bits) contains the number of paths being used for the information to which this packet belongs. For example, if path number field value is set to zero (e.g., 0x00), this indicates that the session has not been split (i.e., there is only a single path for the session to which this packet belongs). The session identification (session ID) field (e.g., eight bits) indicates the session identification for the session (i.e., stream) to which this packet belongs.

The sequence number field (e.g., 32 bits) is an optional field that contains the sequence number of the payload. The sequence number field is present only if the "S" field (sequence number present field) bit is set (generally, this field will be used). The acknowledgement number (e.g., 32 bits) contains the sequence number of the highest numbered Generic Routing Encapsulation packet received by the sending peer for this user session. This field is present only if the "A" field (acknowledgment sequence number present) bit is set.

Systems and methods are disclosed herein to provide IP bonding. For example, in accordance with an embodiment of the present invention, an IP bonding scheme is disclosed that modifies Generic Routing Encapsulation techniques such that information may be divided and carried through multiple paths (e.g., to improve capacity). The exemplary implementations disclosed, in accordance with one or more embodiments of the present invention, are flexible and allow for certain types of traffic to be not split between multiple paths (e.g., such as voice over IP (VoIP) traffic). Thus, for example, the IP bonding mechanism may be applied only to those streams of data, which would benefit from (or not be harmed by) traveling down separate paths.

Other protocols are available, such as Real Time transport Protocol (RTP), Transmission Control Protocol (TCP over Internet Protocol (IP)), Internet Protocol Security (IPSec), and Layer 2 Tunneling Protocol (L2TP), but the techniques described herein (i.e., modified Generic Routing Encapsulation protocol techniques) may offer certain advantages in implementing higher level bonding methods. For example, the modified Generic Routing Encapsulation protocol may be encapsulated within Internet Protocol Security (IPSec). Furthermore, there is no inherent reliance on any particular protocol (e.g., point-to-point protocol (PPP), user datagram protocol (UDP), or transmission control protocol (TCP)) and a portion of the Generic Routing Encapsulation protocol may be reused (e.g., sequence numbering or acknowledgements).

Additional advantages may be provided by the techniques discussed herein relative to conventional approaches. For example, conventional inverse multiplexing schemes may not scale to next generation networks (e.g., as companies migrate away from ATM, IMA becomes impractical to implement, and ML-PPP relies on PPP while many broadband systems use Dynamic Host Configuration Protocol (DHCP)). It may also be difficult (or not appropriate) to modify IPv4 or IPv6 for inverse multiplexing, while a drawback of conventional Ethernet bonding schemes is their layer 2 dependence (e.g., the Ethernet).

In contrast, in accordance with one or more embodiments of the present invention, techniques are disclosed herein that may provide an inverse multiplexing scheme that may exist between layer 2 and layer 3 (e.g., by encapsulating IP). Consequently, the scheme may be independent of the physical layer and may be deployed to resolve "last mile" issues for broadband delivery mechanisms (e.g., wired or wireless). For example, the scheme can encapsulate IP between two physical endpoints, where the physical data rate is most likely to be constrained, without traversing an end-to-end network. As a further exemplary implementation, the scheme may prepend the IP with two bytes of information (e.g., path or channel ID of three bits, session ID of five bits, and sequence number of eight bits). Thus, for this example, up to 8 channels and 32 sessions may be bonded (or four channels with redundancy or failover) and up to 256 packets sequenced.

Furthermore, the techniques discussed herein may offer certain additional advantages. For example, physical links or paths may not need to be operated at the same speeds. Also, traffic that does not need to be bonded (e.g., VoIP) can still be routed over a bonded channel (e.g., a unique session ID may be provided and the traffic sent over only one channel ID or path). Load balancing may also be performed, especially for traffic that does not need to be bonded, by assigning a unique session ID and sending the traffic over a single channel such that non-bonded traffic shares the channel with bonded traffic.

Embodiments described above illustrate but do not limit the invention. It should also be understood that numerous modifications and variations are possible in accordance with the principles of the present invention. Accordingly, the scope of the invention is defined only by the following claims.

We claim:

1. A system comprising:

a first device adapted to provide information through one or more channels by utilizing a modified Generic Routing Encapsulation, wherein the first device comprises:

a memory adapted to store instructions; and at least one processor adapted to execute the instructions stored in the memory to provide the information through the one or more channels;

wherein the modified Generic Routing Encapsulation comprises a path identification field that identifies which of the channels is to provide the information, a session identification field that identifies the session to which the information belongs, a path number field that indicates the number of channels utilized to provide the information, and a sequence number field that identifies the sequence number of the information within the session; and wherein the modified Generic Routing Encapsulation performs channel bonding at an Internet Protocol layer for selected ones of the channels.

2. The system of claim 1, further comprising a second device adapted to receive and decapsulate the information through one or more of the channels, wherein the first device is associated with a first IP address, the second device is associated with a second IP address, and each of the channels is associated with a corresponding channel IP source address and a corresponding channel IP destination address, wherein the one or more channels each represent a different physical path.

3. The system of claim 1, wherein the first device further encapsulates the information by utilizing Internet Protocol Security.

4. A machine-readable medium containing instructions executable by a processor for performing a communication bonding method comprising:

dividing a block of information into a number of sections to provide through one or more channels; and applying a modified Generic Routing Encapsulation, which includes a path identification, a path number field, a sequence number field, and a session identification to the sections of the information;

wherein the path number field indicates the number of channels being utilized to provide the information, wherein the sequence number field indicates the sequence number of the section of the information, and wherein the applying provides for the communication bonding at an Internet Protocol layer for the one or more channels.

5. The machine-readable medium of claim 4, wherein the one or more channels each represent a different physical path.

6. The machine-readable medium of claim 4, wherein the method further comprises encapsulating the sections of the information within an Internet Protocol Security measure.

7. The machine-readable medium of claim 4, wherein the method further comprises removing the modified Generic Routing Encapsulation to provide decapsulation of the sections of the information and restore the block of information.

8. A processor-implemented method of performing channel bonding, the method comprising:

splitting information into a number of sections;

encapsulating the sections, wherein the encapsulating comprises a path identification, a path number field, a sequence number field, and a session identification within a modified Generic Routing Encapsulation method; and providing the sections through one or more channels, wherein the channel bonding is performed at an Internet Protocol layer.

9. The method of claim 8, wherein the encapsulating utilizes the Generic Routing Encapsulation methods to provide the information through a plurality of the channels, wherein each of the channels represent a physical path, and wherein the path number field indicates the number of channels being utilized to provide the information.

10. The method of claim 8, wherein the sequence number field indicates the sequence number of the section of the information.

11. The method of claim 8, wherein at least one of the channels is of a first type having a first data rate and at least one of the channels is of a second type having a second data rate.

12. The method of claim 8, further comprising providing non-bonded information through one or more of the channels.

13. A system comprising:

means for dividing information into a number of sections;

means for encapsulating the sections, wherein the encapsulating utilizes modified Generic Routing Encapsulation methods and comprises a path identification, a path number, a sequence number, and a session identification; and means for providing the sections through a plurality of channels, wherein the modified Generic Routing Encapsulation performs channel bonding at an Internet Protocol layer for the channels that represent physical paths, and wherein the path identification identifies the channel that provided the section of information, the path number indicates the number of channels being utilized to provide the information, the sequence number indicates the sequence number of the section of the information, and the session identification identifies the session to which the information belongs.

* * * * *